United States Patent [19]

Galbraith

[11] Patent Number: 4,849,245

[45] Date of Patent: Jul. 18, 1989

[54] TURKEY PRODUCT IN A FORM READY FOR COOKING AND A METHOD OF CUTTING TO FORM SAME

[75] Inventor: Robert H. Galbraith, Marshville, N.C.

[73] Assignee: Cuddy Farms, Inc., Marshville, N.C.

[21] Appl. No.: 157,648

[22] Filed: Feb. 18, 1988

[51] Int. Cl.⁴ .............................................. A23L 1/315
[52] U.S. Cl. .......................................... 426/644; 17/52
[58] Field of Search ................ 426/644, 518; 17/11 B, 17/46, 52

[56] References Cited

U.S. PATENT DOCUMENTS 3,192,051 6/1965 Wendt et al. ...................... 17/46 X Primary Examiner—Arthur L. Corbin
Attorney, Agent, or Firm—Shefte, Pinckney & Sawyer

[57] ABSTRACT

A turkey product that is an integral combination of a turkey breast, a portion of the upper back and the wings, with the upper back portion supporting the breast in an upwardly inclined cooking position and the wings stabilizing the breast in this position for enhanced cooking. The product is formed by severing the neck of a whole turkey at the fourteenth cervical vertebra, severing the rectus abdominus muscle and related skin along a natural line between the anterior thigh muscle and the posterior edge of the rib cage, and separating the product from the rear portion of the turkey between the sixth and seventh thoracic vertebra.

3 Claims, 4 Drawing Sheets

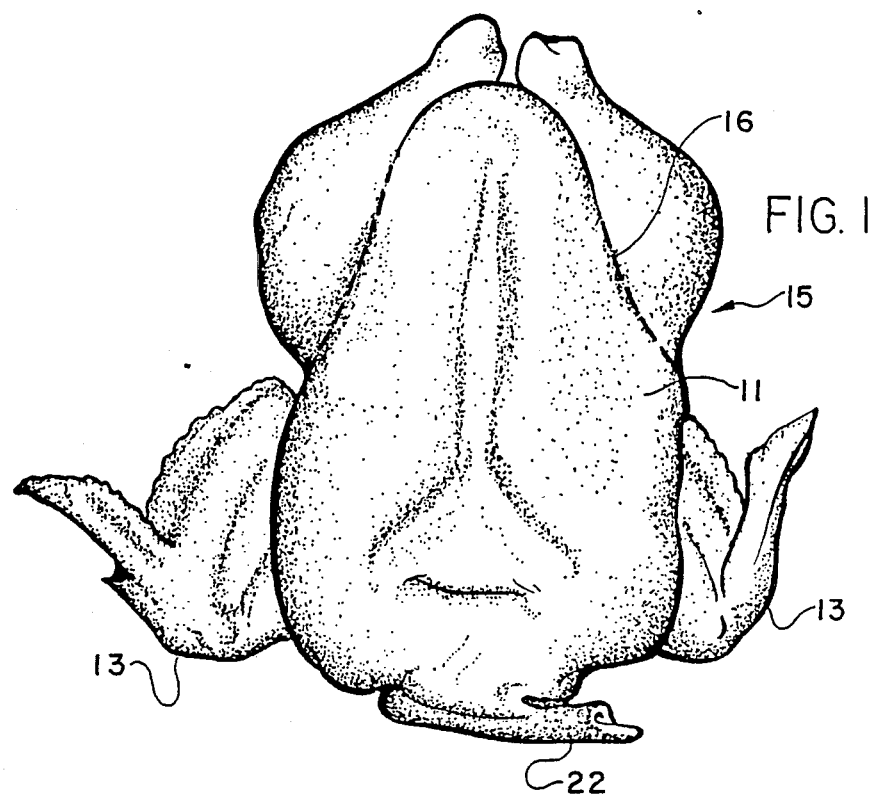
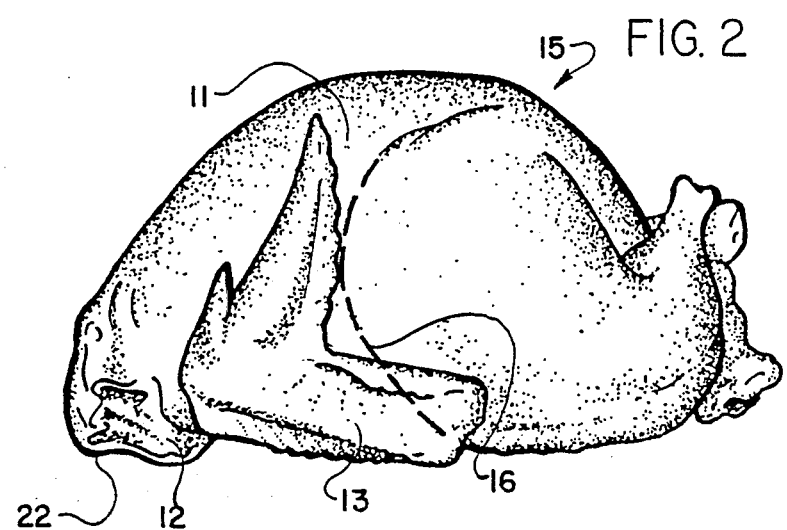

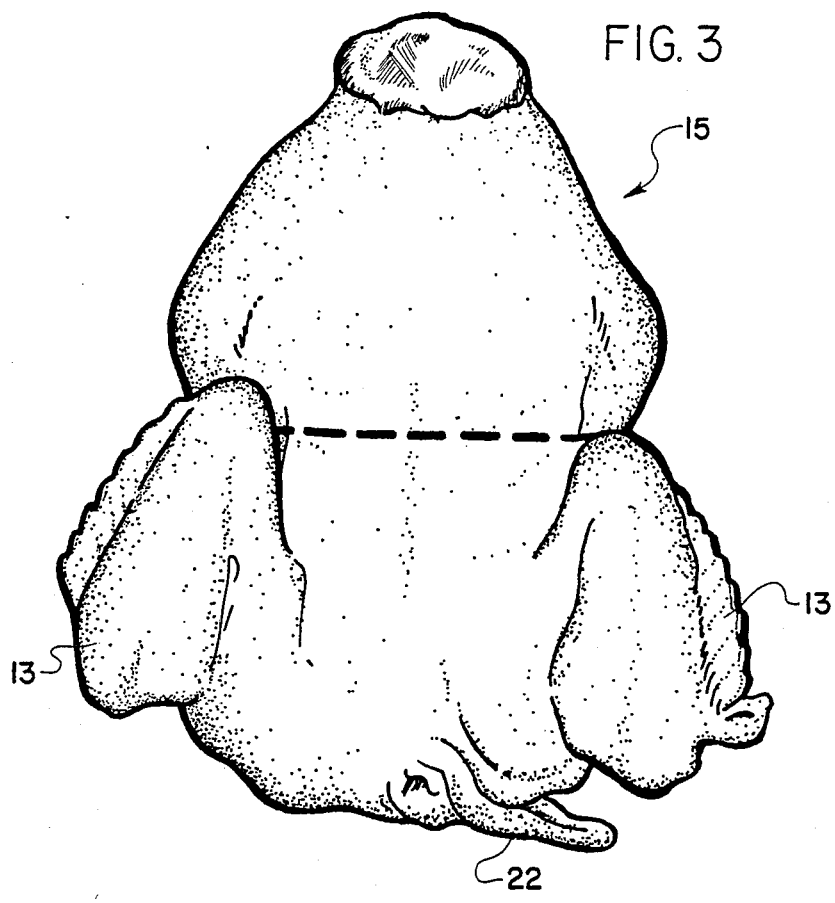

TURKEY PRODUCT IN A FORM READY FOR COOKING AND A METHOD OF CUTTING TO FORM SAME

BACKGROUND OF THE INVENTION

The present invention relates to a turkey product and a method of cutting the turkey to provide a product in the form ready for cooking, and more particularly relates to such a product and method wherein a turkey breast can be supported and stabilized in a proper position for cooking.

Turkeys are conventionally eviscerated and dressed and sold either as whole turkeys or as turkey parts. One of the parts that is in substantial demand is the turkey breast, which is marketed either boned or bone-in. Customers often prefer the bone-in turkey breast because it is less expensive and is considered by some to be more flavorful than a boned turkey breast. However, a bone-in turkey breast is not stable in the usual desired cooking position and tends to roll to one side or the other from a desired position.

Such bone-in turkey breasts are normally prepared by severing the rear portions of the turkey from the breast at a point along the back, and then severing the wings.

By the present invention, a turkey product is provided that includes the breast, a portion of the upper back and the wings, which is normally an intermediate form of cutting of a turkey, rather than the final form. Heretofore, it has not been the practice or the desire of the art to present a product for cooking in this form.

SUMMARY OF THE INVENTION

Briefly described, the turkey product of the present invention is a substantially complete turkey breast, a portion of the upper back integral with the breast and substantially complete wings integral with the breast and upper back portion. The upper back portion provides support for the breast in an upwardly inclined cooking position and the wings provide stability for the breast in the cooking position. Preferably, the upper back portion is a portion inclined with respect to the breast and interrelated with the integral wings, facilitating disposition of the breast in the upwardly inclined cooking position. In the preferred embodiment, the upper back portion begins with approximately the fourteenth cervical vertebra and terminates with approximately the sixth thoracic vertebra to provide the desired supporting shape.

The method of cutting the turkey according to the present invention to provide a breast and selected connecting parts in a form for enhanced cooking with the breast in an upwardly inclined cooking position, includes severing and removing the parts of the turkey rearwardly of the breast while allowing a portion of the upper back and the wings to remain integral with the breast for support of the breast in cooking position by the remaining upper back portion and stabilization of the breast in cooking position by the wings. Preferably, the severing is rearward of a portion of the upper back that is inclined with respect to the breast for support of the breast on the inclined upper back portion at the upwardly inclined cooking position. In the preferred embodiment, the severing includes severing and removing the neck at the fourteenth cervical vertebra, severing the rectus abdominus muscle and related skin along a natural line between the anterior thigh muscle and the posterior edge of the rib cage and separating between the sixth and seventh thoracic vertebra.

Other and further features and advantages of the present invention will be apparent from the accompanying drawings and following detailed description of the preferred embodiment.

BRIEF DESCRIPTION OF THE DRAWINGS

FIG. 1 is a plan view looking down at a turkey that is laying with its breast uppermost;

FIG. 2 is a side elevation of the turkey of FIG. 1;

FIG. 3 is a bottom plan view of the turkey of FIG. 1;

DESCRIPTION OF THE PREFERRED EMBODIMENT

Figure 6:
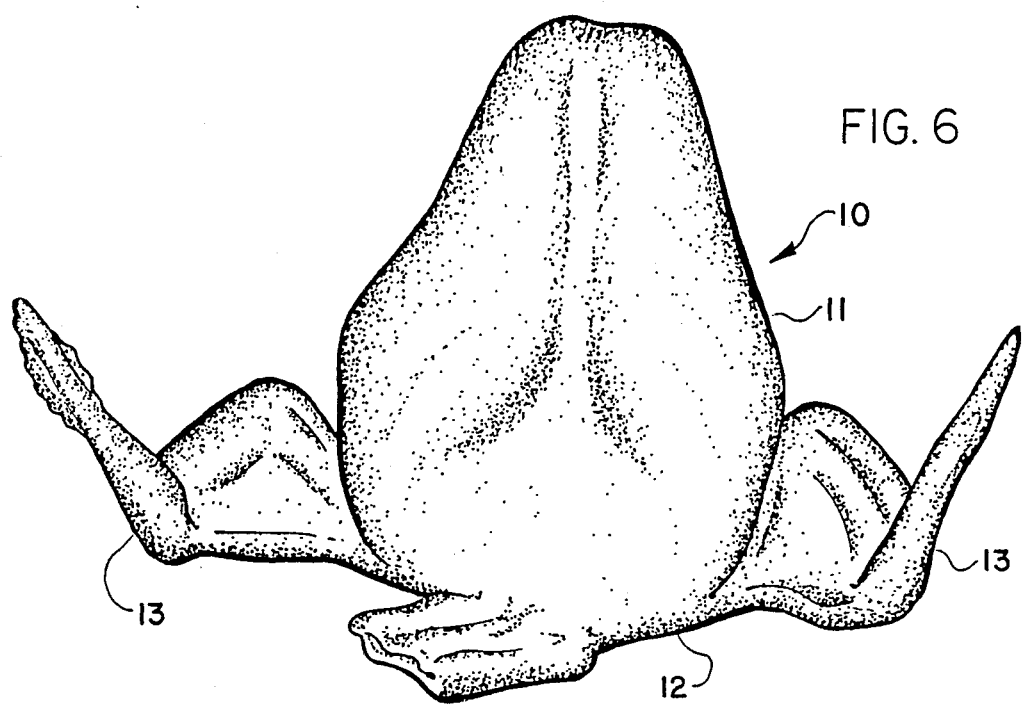
FIG. 6 is a front elevation of the severed breast, upper back portion and wings of FIG. 4, showing the breast supported and stabilized in an upwardly inclined position for enhanced cooking.
Figure 7:
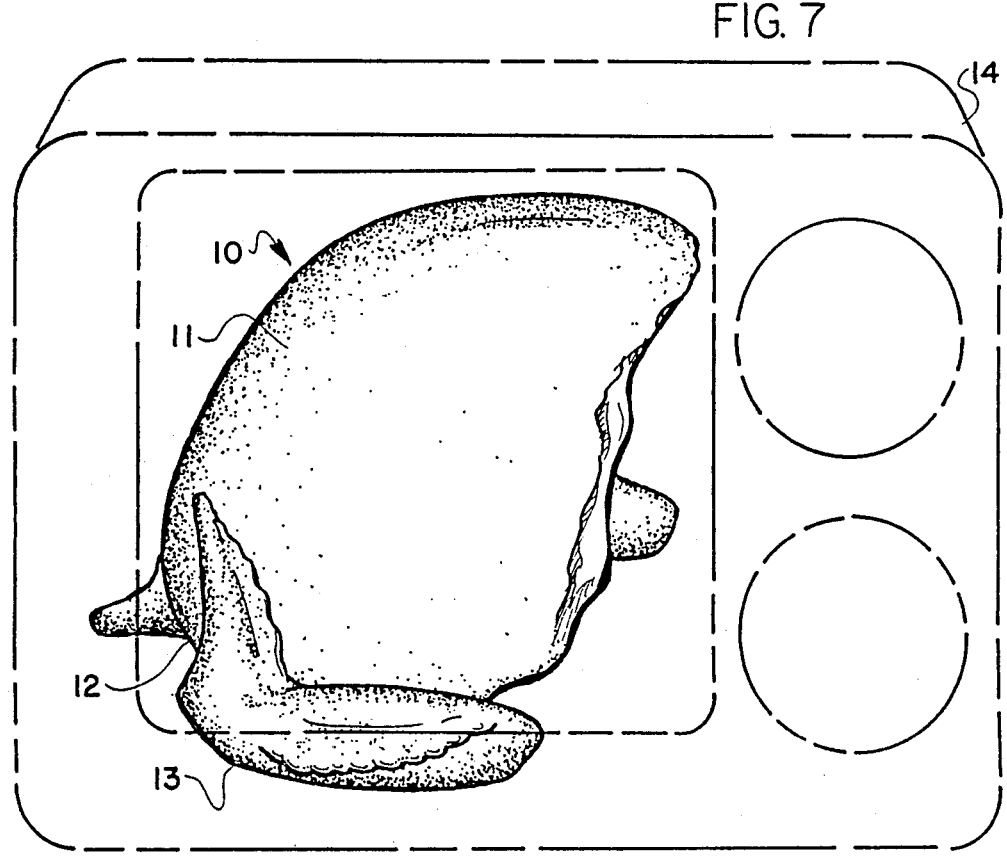
FIG. 7 is a side elevation of the breast, upper back portion and wings of FIG. 6 with the breast in its upwardly inclined supported and stabilized position, with the outline of a microwave oven showing the position of the product for cooking therein.

Referring to FIGS. 6 and 7, the turkey product 10 of the present invention is illustrated in position for cooking. The product 10 includes a bone-in breast 11, a portion 12 of the upper back, and wings 13. These parts are integral and have not been severed or otherwise separated from each other. The portion 12 of the upper back is a portion that is inclined with respect to the general shape of the breast 11 so that when the product 10 is positioned on the portion 12 of the upper back the breast 11 will be supported in an upwardly inclined cooking position. The wings 13 provide stabilization of the breast 11 in this upwardly inclined cooking position.

As seen in FIG. 7, when placed in a microwave oven 14, the product 10 is in an enhanced cooking disposition, in comparison with that of a conventionally cut turkey breast that lies unsupported and is difficult to properly position or stabilize in the proper position without external support.

Figure 4:
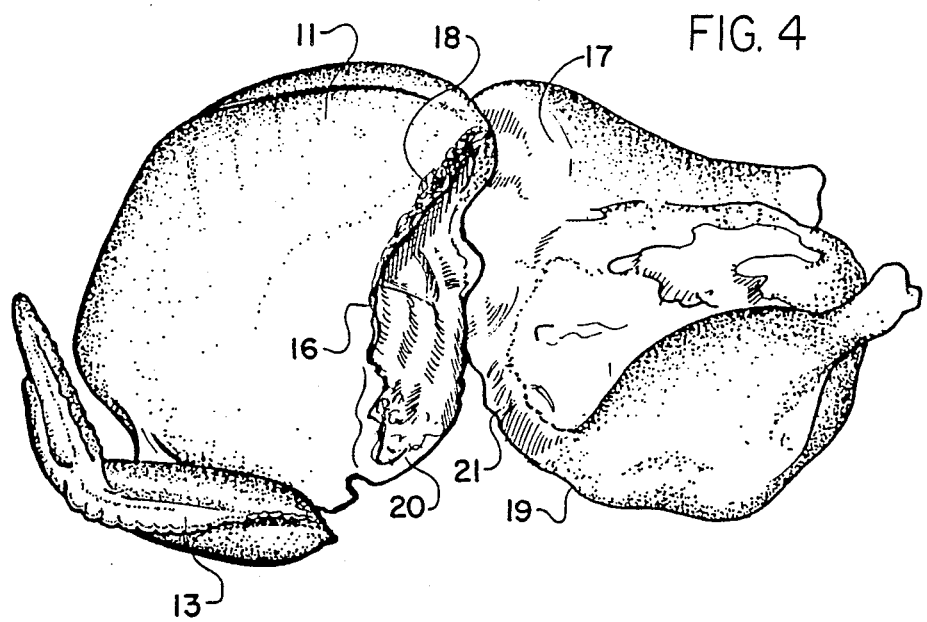
FIG. 4 is a side elevation of the turkey of FIG. 2 after severing according to the present invention.
Figure 5:
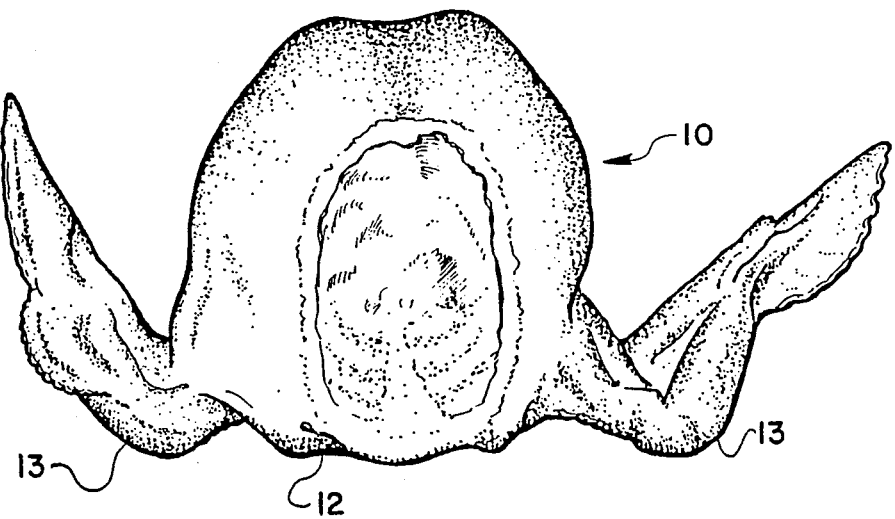
FIG. 5 is a rear elevation of the severed breast, upper back portion and wings of FIG. 4.

The product 10 is formed by the cutting procedure illustrated in FIGS. 1–4. In FIGS. 1 and 2, a whole eviscerated and dressed turkey 15 is illustrated. The line of cutting 16 is illustrated in heavy dash lines. FIG. 4 illustrates the parts of the turkey after severing along the lines 16 in FIGS. 1 and 2. This severing is along a natural line between the anterior thigh muscle 17 and the posterior edge of the rib cage 18. This severs the rectus abdominus muscle and related skin from the breast 11. The severing is completed by separating the rear portion 19 of the turkey from the breast 11, upper back portion 12 and wings 13 by cutting between the sixth and seventh thoracic vertebra, 20 and 21 respectively, creating a complete turkey breast product 10 that includes a portion of the upper back 12 and wings 13, as illustrated in FIGS. 4–7. The severing also includes severing the neck 22 at approximately the fourteenth cervical vertebra.

The severing described above is a conventional severing intermediate the cutting of a turkey into parts, and particularly at an intermediate stage before further cutting to produce a turkey breast. Conventionally, further cutting is performed, particularly to remove the wings, as turkey breasts are not marketed with wings and such combination has not heretofore been considered acceptable. Furthermore, it has not heretofore been recognized that by severing as taught by the present invention a product according to the present invention is produced that is capable of self-supporting and self-stabilizing in a position in which the breast is upwardly inclined for enhanced cooking.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A turkey product in a form ready for cooking consisting essentially of a substantially complete bone-in turkey breast, a portion of the upper back integral with said breast, and substantially complete wings integral with said breast and upper back portion, said upper back portion providing a resting surface for placement on a generally horizontal cooking surface to support said breast elevated from said cooking surface in an upwardly inclined position for cooking and said wings providing lateral engagement with said cooking surface at opposite lateral sides of said upper back portion for stabilization of said breast in said inclined position.

2. A turkey product according to claim 1 and wherein said upper back portion is a portion inclined with respect to said breast and interrelated with said integral wings for facilitating disposition of said breast in said upwardly inclined cooking position.

3. A turkey product according to claim 2 and wherein said upper back portion begins with approximately the fourteenth cervical vertebra and terminates with approximately the sixth thoracic vertebra.

* * * * *